(No Model.)

T. G. COOK.
SULKY SPRING TOOTH HARROW.

No. 473,141. Patented Apr. 19, 1892.

Witnesses:
John Grist
O. H. Horsey.

Inventor:
Thomas G. Cook
By Henry Grist
Attorney.

UNITED STATES PATENT OFFICE.

THOMAS GRIER COOK, OF BROCKVILLE, CANADA.

SULKY SPRING-TOOTH HARROW.

SPECIFICATION forming part of Letters Patent No. 473,141, dated April 19, 1892.

Application filed November 27, 1891. Serial No. 413,160. (No model.)

*To all whom it may concern:*

Be it known that I, THOMAS GRIER COOK, of Brockville, in the Province of Ontario, in the Dominion of Canada, have invented certain new and useful Improvements in Sulky Spring-Tooth Harrows; and I do hereby declare that the following is a full, clear, and exact description of the same, reference being had to the accompanying drawings, in which—

Figure 1:
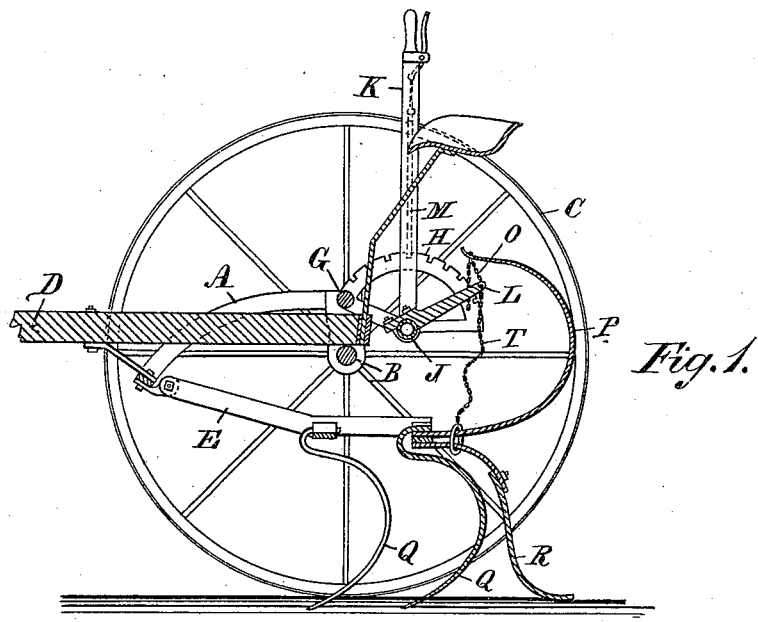
Figure 2:
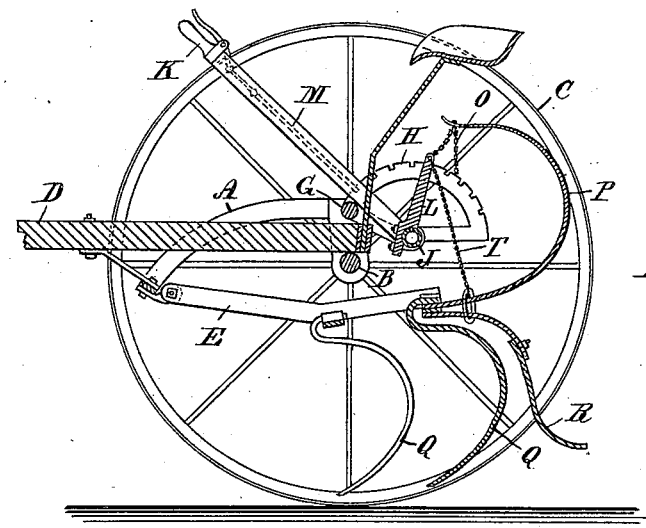

Figure 1 is a vertical section of a wheeled harrow embodying my invention and showing the spring under tension, whereby the harrow-teeth are forced into the ground and the harrow-frame permitted to yield to obstructions to the teeth; and Fig. 2 is a like view of the same, showing the spring released from tension and the harrow-teeth raised out of the ground by the hand-lever and connections which apply tension to the spring.

My invention has for its object to provide improved means for forcing the harrow-teeth into the ground, to allow the harrow-sections, to yield when the harrow-teeth are obstructed, and to raise the harrow sections or frames bodily for lifting the teeth from the ground.

My invention consists in certain features of construction and combination of parts, as will herein be described, and set forth in the claim.

A A are the side bars of the sulky-frame, suitably mounted on the axle B of the wheels C.

D is the draft-tongue, and E the harrow-sections hinged at the front to the front bar of the sulky-frame.

G is the rear bar of the sulky-frame, and to said frame is fixed a notched quadrant H.

J is a rock-shaft journaled in the side bars of the sulky-frame, and said shaft is provided with a hand-lever K to rock the shaft and an arm L, extending rearwardly above and over each harrow-section. The rock-shaft passes through the hub of the quadrant, and the lever K is provided with a spring-bolt M, which engages the notches of the quadrant to lock shaft J when rocked, and to the outer or rear end of the arm J is connected a chain O.

P is a C-shaped spring, the convexity of the bow facing rearwardly, and the spring stands vertically. The lower end of the spring is secured to the rear part of the harrow-section, and the upper end of the spring terminates above the arm L, to which it is connected by the chain O, so that by rocking the shaft J the arm L will, by the chain O, depress the upper end of the spring P and bring said spring under tension, whereby the resiliency will cause the lower end of the spring to force the harrow-section downwardly, and thereby cause the teeth Q under pressure of the spring to be forced into the ground.

R are S-shaped shoes attached at one end to the harrow-sections. The outer ends of said shoes trail on the ground and are adjustable in length to regulate the depth of penetration of the teeth.

T is a chain connecting the arm L to the rear part of the harrow-sections to lift said sections bodily when the the lever K is moved forward to rock shaft J, whereby the teeth will be raised from the ground to allow the machine to travel freely on roads, &c.

The chains O and T, if preferred, may be in one piece and permanently attached to the arm L to prevent loss, and the upper or free end of the spring is slotted longitudinally to receive and hold a link removably, so that the chain may be readily disconnected from the spring when it is desired that the harrow-sections shall work without the intervention of the spring.

I claim as my invention—

The combination, with the sulky-frame consisting of side bars A A, connected by a front and rear bar, of harrow-sections E, hinged at the front to the sulky-frame, vertical C-shaped springs P, connected at the lower ends to the rear part of the harrow-sections, the upper end of said springs normally free, rock-bar J, journaled to the sulky-frame and having an operating-lever K and arms L, chains O, connected to said arms and removably connected to the free ends of said springs, and chains T, connecting said arms to the harrow-sections, whereby greater or less spring-pressure is applied at pleasure to the harrow-sections and, when desired, the harrow-sections freed from the operation of the springs and bodily lifted, as and for the purpose set forth.

THOMAS GRIER COOK.

Witnesses:
 JAS. A. NEWELL,
 CHAS. A. MCLEAN.